United States Patent
Boettiger et al.

(10) Patent No.: US 9,348,755 B2
(45) Date of Patent: May 24, 2016

(54) LIST-BASED PREFETCHING

(71) Applicant: International Business Machines Corporation, Armonk, NY (US)

(72) Inventors: Hans Boettiger, Tuebingen (DE); Thilo Maurer, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 14/049,287

(22) Filed: Oct. 9, 2013

(65) Prior Publication Data

US 2014/0108741 A1     Apr. 17, 2014

(51) Int. Cl.
- *G06F 13/12* (2006.01)
- *G06F 12/08* (2016.01)
- *G06F 9/38* (2006.01)
- *G06F 3/00* (2006.01)

(52) U.S. Cl.
CPC ............ *G06F 12/0862* (2013.01); *G06F 9/383* (2013.01); *G06F 9/3832* (2013.01); *G06F 2212/6024* (2013.01)

(58) Field of Classification Search
None
See application file for complete search history.

(56) References Cited

U.S. PATENT DOCUMENTS

| | | | | |
|---|---|---|---|---|
| 4,464,712 A | * | 8/1984 | Fletcher | 711/122 |
| 5,450,563 A | * | 9/1995 | Gregor | 711/3 |
| 5,539,895 A | * | 7/1996 | Bishop et al. | 711/138 |
| 6,175,906 B1 | * | 1/2001 | Christie | 711/207 |
| 6,606,663 B1 | * | 8/2003 | Liao et al. | 709/229 |
| 7,716,424 B2 | | 5/2010 | Franaszek et al. | |
| 7,925,865 B2 | | 4/2011 | Chou et al. | |
| 2011/0119426 A1 | | 5/2011 | Boyle et al. | |
| 2011/0219208 A1 | | 9/2011 | Asaad et al. | |
| 2012/0066456 A1 | | 3/2012 | Leonid et al. | |

OTHER PUBLICATIONS

Briz, Jose et al., Multi-level Adaptive Prefetching based on Performance Gradient Tracking, Journal of Instruction-Level Parallelism 13, Jan. 2011, 1-14.
Byna, Surendra et al, Taxonomy of Data Prefetching for Multicore Processors, Journal of Compute Science & Technology, May 2009, 24(3), 405-417, Dept Computer Sci., Chicago IL.
Dimitrov, Martin et al, Combining Local and Global History for High Performance Data Prefetching, Journal of Instruction-Level Parallelism 13, Jan. 2011, 1-14.

* cited by examiner

*Primary Examiner* — Henry Tsai
*Assistant Examiner* — Dean Phan
(74) *Attorney, Agent, or Firm* — Cahn & Samuels, LLP

(57) ABSTRACT

A computer implemented method for prefetching data for a processor into a first memory, wherein in a recording mode, a prefetching unit for a processor performs the steps of a method. The method includes: receiving one or more first addresses from the processor; filtering the one or more first addresses; providing a recording-list including the filtered one or more first addresses; receiving at least one second address from the processor; receiving a playback-list including all or a subset of the first addresses of the recording-list; comparing the at least one second address with each of the first addresses in the playback-list for identifying a matching address; if a matching address is identified, fetching data from a second memory; and transferring the fetched data to a first memory.

15 Claims, 5 Drawing Sheets

FPU: Floating Point Unit
PPC: Power Performance Chip
L1: L1 Cache
L2: L2 Cache
PF: Prefetching Unit

LIST-BASED PREFETCHING

CROSS-REFERENCE TO RELATED APPLICATION

This application claims priority under 35 U.S.C. §119 from Patent Application No. GB1218303.4 filed Oct. 12, 2012, the entire contents of which are incorporated herein by reference.

BACKGROUND OF THE INVENTION

1. Field of the Invention

The present invention relates to the field of data processing. More particularly, the present invention relates to prefetching data for a processor by means of an address list.

2. Description of the Related Art

Efficient memory management is crucial for allowing a processor to realize its full potential to process data efficiently. Memory management includes dynamically determining data that is required by a processor in future processing steps. The data is fetched in advance into a data cache of the processor ("prefetching"). Several prefetching methods exist having been developed to increase the efficiency of memory management. For example, there exist history based prediction strategies analyzing a history of unsuccessful access trials for predicting which data shall be prefetched.

Processing systems making use of cache memory are disclosed in the prior art. Cache memories are very high-speed memory devices increasing the speed of the processor by making prefetched data available to the processor with a minimum amount of latency. Although cache memory is only a small fraction of the size of the main memory, typically a large fraction of memory requests are successfully found in the fast cache memory, because of the "locality of reference" property of programs. This means that memory references used by a programmer during a given time interval tend to be confined to a few localized areas of memory.

When a processor is to retrieve some required data from the main memory, at first the cache is examined. If the required data is already found in the cache (because it was prefetched), the data is read from the (fast) cache. The (comparatively slow) main memory is not accessed. Only in case the required data is not found in the cache, the main memory is accessed.

Thus, ideally, all required data are prefetched far enough in advance so that a copy of the data is already in the fast cache when the processor needs it. The amount of data that can actually be prefetched is, however, limited by the small size of the fast cache memory.

BRIEF SUMMARY OF THE INVENTION

The present invention provides a computer implemented method for prefetching data for a processor into a first memory, wherein in a recording mode, a prefetching unit of the processor performs the steps of a method including: receiving one or more first addresses from the processor, wherein the one or more first addresses is a load address; filtering the one or more first addresses for removing at least some of the first addresses from a list; providing a recording-list including the filtered one or more first addresses, wherein in a playback mode, the prefetching unit executes: receiving at least one second address from the processor, wherein the at least one second address is a load address; receiving a playback-list, wherein the playback-list includes all or a subset of the first addresses in the recording-list; comparing the at least one second address with each of the first addresses in the playback-list for identifying a matching address within the playback-list; fetching data, in case a matching address is identified, from a second memory, wherein the fetched data is identified by addresses sequential to the position of the matching address in the playback-list; and transferring the fetched data to the first memory, wherein the first and the second memory are caches within a multi-level cache of the processor.

Another aspect of the present invention provides a prefetching-unit for prefetching data, including: a first memory and a second memory; and a processor communicatively coupled to the memory; the prefetching unit communicatively coupled to the first memory, the second memory, and the processor, wherein the prefetching unit of the processor in a recording mode is adapted to perform the steps of a method, including: receiving one or more first addresses from the processor, wherein the one or more first addresses is a load address; filtering the one or more first addresses for removing at least some of the first addresses from a list; providing a recording-list including the filtered one or more first addresses, wherein the prefetching-unit, in a playback mode, is adapted to execute: receiving at least one second address from the processor, the at least one second address being a load address; receiving a playback-list, the playback-list including all or a subset of the first addresses of the recording-list; comparing the at least one second address with each of the first addresses in the playback-list for identifying a matching address within the playback-list; fetching data, in case a matching address is identified, from a second memory, wherein the fetched data is identified by addresses sequential to the position of the matching address in the playback-list; and transferring the fetched data to a first memory.

BRIEF DESCRIPTION OF THE DRAWINGS

Features and advantages of the invention will be better understood by reading the following more particular description of embodiments of the invention in conjunction with the figures wherein.

DETAILED DESCRIPTION OF THE PREFERRED EMBODIMENTS

Figure 1:
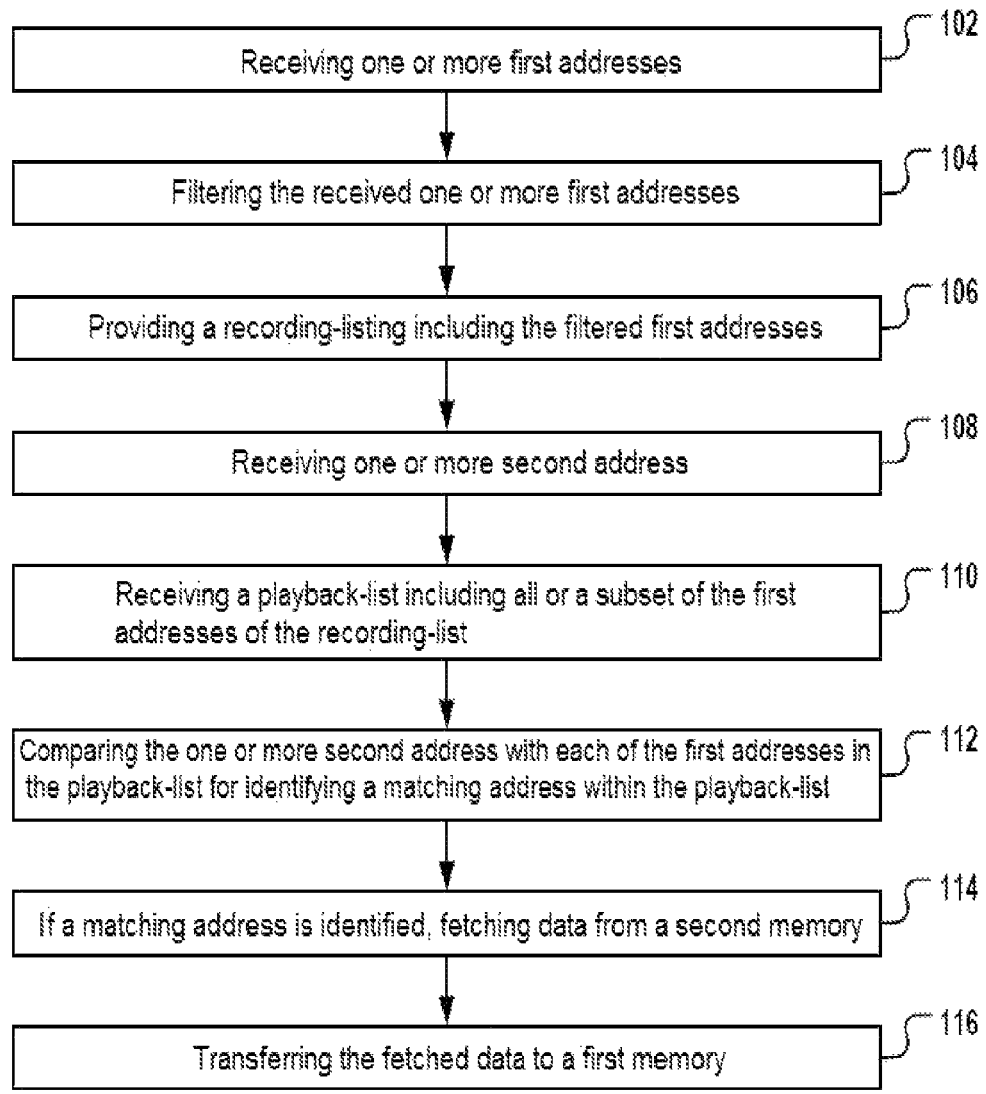
FIG. 1 is a flow-chart of a method for prefetching data.

The present invention to provide for an improved method for prefetching data for a processor. It is understood that the embodiments mentioned in the following can be combined freely with each other as long as they are not mutually exclusive.

A 'first memory' as used herein is a memory which is used by a processor for caching data. In an embodiment of the present invention, the memory is a volatile memory.

Analogously, a 'second memory' as used herein is a memory that is used by the processor as a cache, wherein the first and second memories constitute or belong to a hierarchy of caches of the processor. The second memory, in an embodiment of the present invention, is a volatile memory. According to the terminology used herein, the first memory is a cache closer to the processor within the cache hierarchy as the second memory. The closeness corresponds to the latency time of the processor requesting data from ther memory. The closer the memory, the shorter the latency time. In an embodiment, the first and second memory can respectively be at the first and second positions within the cache hierarchy or can be at any other subsequent positions, e.g. second and third, third and fourth, and so on. Typically, the closer a cache lies to the processor in respect to the cache hierarchy, the faster and more expensive the cache and the smaller the cache space.

A 'load address' as used herein is an address of a piece of data which is requested from a memory by a processor executing a program logic, e.g. an application program or routines of an operating system. The memory can be the main memory or a cache of the main memory.

A 'miss address', or 'miss' as used herein, is a load address of a first memory which was requested by a processor and whose corresponding data was determined not to be contained in the first memory when the processor accessed the first memory.

A 'hit address', or 'hit' as used herein, is a load address of a first memory which was requested by a processor and whose corresponding data was determined to be contained in the first memory when the processor accessed the first memory.

Thus, a load address can turn out to be a hit address or a miss address. Both terms 'hit addresses' and 'miss addresses' are subsumed by the generic name 'load address'. Physically, a load address of unknown status and a hit or miss address can not differ at all in some embodiments of the present invention. In other embodiments, load addresses are flagged, e.g. by a particular bit value, as being miss addresses or hit addresses after the processor has successfully or unsuccessfully tried to get the corresponding data from the first memory.

In one aspect, the invention relates to an information processing system for prefetching data for a processor. The processor can include or be operatively coupled to a prefetching unit. The prefetching unit can be able to operate in recording mode and/or in playback-mode.

In recording mode, the prefetching unit executes:
  receiving one or more first addresses from the processor. The one or more first addresses are load addresses. Thus, the status of the load addresses as being a miss address or a hit address can not be known at the moment of receiving the load addresses or the information can not have an impact on the receipt of the addresses. Preferentially, the load addresses are received in the order as requested by the processor executing a program logic;
  filtering the received one or more first addresses for removing at least some of the first addresses from the list; and
  providing a recording-list consisting of the filtered one or more first addresses.

In playback mode, the prefetching unit executes:
  receiving one or more second address from the processor, the one or more second address being a load address;
  receiving a playback-list, the playback-list including all or a subset of the first addresses of the recording-list;
  comparing the one or more second address with each of the first addresses in the playback-list for identifying a matching address within the playback-list;
  in case a matching address is identified, fetching data from a second memory, wherein the fetched data is identified by addresses sequential to the position of the matching address in the playback-list; and
  transferring the fetched data to a first memory.

The first and second memories are caches within a multi-level cache of the processor. Thereby, the first memory is at a level of the hierarchy which is closer to the processor than the level of the second memory. This means that the processor will at first try to load required data from the first memory, and only in case the data cannot be found there, it is retrieved from the second memory. The first memory is not necessarily the L1 cache, it can also be e.g. the third memory cache in said cache hierarchy, whereby in this case the second memory can be the fourth memory cache of the hierarchy.

Receiving the load addresses (and not only the miss addresses) from the processor can be advantageous as prefetching can thus not be limited to miss addresses. This can allow for a more reliable and accurate prediction of the data to be prefetched. In state of the art list-based methods, selectively the miss addresses are received by a prefetching unit e.g. during the first iteration of a program loop. The miss addresses recorded for the first iteration are used for predicting the data to be fetched in further program loop iterations in time. At least for the first iteration whether the load addresses are miss addresses or not is influenced by other concurrent threads. Therefore, reproducibility of the collected list is not given and processor performance on later playback is reduced. By receiving all load addresses, i.e., including the actual or potential hits as well as the actual or potential misses, data can be prefetched reproducibly and consistently for each iteration of a program loop. The filtering of the load addresses ensures that the number of first addresses actually used for prefetching data is small enough to enable a reliable matching-progress, and also to avoid pollution of a second memory with lengthy address lists. In a further beneficial aspect, the data prefetched per thread can cover the data space actually processed by a thread more completely and can include less non-prefetched gaps compared with purely miss address based prefetching. A recording list can have a 'base address'. The 'base address' of a recording list as used herein is an address in the main memory pointing to the first position of said recording list.

According to an embodiment of the present invention, the one or more second address is compared with all or a plurality of the first addresses in the playback-list in parallel. This can be advantageous as the speed of prefetching can be increased.

In case no match is found when the second address has been compared against each of the first addresses in the playback-list, no corresponding prefetching is executed. Rather, a further second address is examined and upon each match, the prefetching is executed as described above.

According to embodiments, filtering includes removing first addresses which:
  lie within an address interval; and/or
  lie outside an address interval;
  follow an address pattern; and/or
  are duplicates of one or more other ones of the first addresses in the list, the other first address lying within a predefined number of most recently added first addresses within said list. This can ensure that a given sub-list of the recording list used during play-back does not include duplicates of a particular first address. Such duplicates can result in fetching the required data twice, thus wasting valuable bandwidth of a data transfer channel to the second memory and wasting valuable memory space of the second memory for storing the duplicate entries in the address-list.

The address interval can be specified as a physical address interval or virtual address interval. The address interval can be, for example, a cache line of the L1 cache. The pattern can include of a pattern-instruction that a particular address can not follow a sub-pattern.

The features can be advantageous, because specified addresses (which match particular patterns and/or lie within or outside a given address interval) are automatically removed from the recording-list and thus are excluded from prefetching. Making use of said filtering executed by a filtering unit of the prefetching unit, it is not necessary to explicitly include or exclude some addresses from prefetching while writing some executable source code. Rather, predefined patterns and address intervals are evaluated by the filtering unit automatically. Thus, the programmer is freed from the burden of explicitly specifying prefetching instructions in the program code. In addition, or alternatively, the compiler does not have to automatically inject such kind of prefetching instructions into the compiled code. In a further beneficial aspect, the address pattern and/or address intervals can specify memory regions of a program containing non-user data, e.g., stack data, whose corresponding data shall not be prefetched.

According to an embodiment, the filtering is executed by a filtering unit of the prefetching unit. The method includes:

configuring the filtering by a filter configuration unit comprising a configuration storage, thereby setting the virtual address interval, the address pattern and/or the predefined number in the configuration storage.

The configuration is executed in accordance with a configuration technique being selected from a group including:

upon compilation of an executable source code, evaluating, by a compiler, user-specified filtering-annotations within the source code; injecting, by the compiler, filter configuration commands into the compiled code in accordance with the filtering annotations; storing, by the processor executing the compiled code, the configuration of the filtering unit in accordance with the configuration commands in the configuration storage;

upon compilation of an executable source code, evaluating, by a compiler, the source code. The source code can be free of filtering-annotations; injecting, by the compiler, filter configuration commands into the compiled code in accordance with the evaluation results; storing, by the processor executing the compiled code, the configuration of the filtering unit in accordance with the configuration commands in the configuration storage.

According to an embodiment of the present invention, the configuration storage of the filtering consists of MMIO registers being readable and writable by the processor. A MMIO register as used herein is a register using Memory-mapped I/O for exchanging data with the processor. An MMIO based data exchange implies that the same address bus is used to address both memory and I/O devices. The memory and registers of an MMIO device are mapped to address values. So when an address is accessed by the CPU, it can refer to a portion of physical RAM, but it can also refer to memory of the I/O device.

According to an embodiment, the first addresses in the recording-list and in the playback-list are ordered chronologically in accordance with their receipt from the processor. In recording mode, the prefetching unit further includes:

storing the recording-list to a write buffer; the write buffer can be an integral part of the prefetching unit; and writing the recording-list to a pre-allocated memory area and emptying the write-buffer and the recording-list.

In playback mode the prefetching unit, upon each identification of a current matching address in the playback-list, includes:

determining a first address position within the list, the first address position being the position of the current matching address;

selecting all first addresses in the playback-list following the first address position (if any), the selected first addresses having been received and added to the recording-list later than the matching address;

moving the selected first addresses to a corresponding number of address positions in the playback-list at begin of the playback-list, thereby overwriting all addresses stored in the corresponding number of address positions, thereby creating one or more empty address positions at the end of the play-back list; in an embodiment of the present invention, in case the matching position was the last position of the playback-list, no first addresses in the list are selected and all address positions in the playback list are emptied; and filling all empty address positions by reading a corresponding number of first addresses of the recording list, the first addresses following the last one of the moved selected first addresses.

The moving of the selected first addresses is executed 'en-block' and can thus also be described as a 'shifting' of addresses within the playback-list upon a match.

In the terminology used herein, the "last one of the moved addresses" lies at the side of the playback list to which new addresses received from the recording list are added upon a shift-refill cycle. For example, in a playback list being 50 addresses long, the leftmost position can be labelled "position 1", the rightmost can be labelled "position 50". In case of a match at position 22, the addresses in positions 23-50 are shifted to the positions 1-27, thereby overwriting the addresses formerly stored at positions 1-27. The empty positions 28-50 are filled by a respective number of addresses sequential to the former address at position 50 from the recording list.

Thus, the playback-list can be considered as a local copy of a subset of the first addresses contained in the recording-list stored in the pre-allocated memory area.

According to an embodiment, upon each identification of a match by the matching unit in respect to a currently requested, second address, the first addresses contained in the playback-list are shifted in a way that all addresses following the matching address are moved to the beginning of the playback-list. Empty address positions are filled with subsequent first addresses of the recording-list in the pre-allocated memory area. After having executed the address shift in the playback-list, the shifted, current playback-list is forwarded to a prefetching engine and used by the prefetching engine for prefetching data identified by the first addresses in the forwarded playback-list. Features can be advantageous as load addresses and not only the miss addresses are compared against the currently requested second address for finding a match and for prefetching data of the subsequence first addresses. Considering hit addresses as well as miss addresses during the matching and shifting operations provides for a better coverage and prediction of the data that will be required by the processor in the future. According to some embodiments, the prefetching by the prefetching engine is based on a push action of the prefetching engine, whereby the transfer of the prefetched data to the processor is initiated by the prefetch engine.

In case no match is found when the second address has been compared against each of the first addresses in the playback-list, no shifting of the addresses of the play-back list and no corresponding prefetching is executed. Rather, a further second address is examined and upon a match of the further second address with one of the addresses in the playback-list, the shifting and list-filling of the playback-list and the prefetching is executed as described above.

According to an embodiment, the prefetching unit generates one recording list and manages one playback-list per thread executed by the processor, the playback-list being a dynamically changing sub-list of the recording-list. The features can allow for a more reliable and accurate prediction of the data to be prefetched. In particular applications optimized to exploit thread-parallelism suffer from seemingly indeterministic recorded miss-addresses in case the first memory is shared among different threads. In a shared-cached environment, miss-addresses not only depend on the program logic executed in one particular thread, but depend on all threads currently operating on the shared first memory. This results in a miss-address pattern which cannot be used to reliably predict the data to be required by the processor for future operations. However, by taking into consideration a filtered list of load addresses on a thread-basis, the prediction accuracy has been observed to be increased in particular for multithreaded environments. The addresses in a thread-based list can include some gaps, but are not chaotic (out of chronological sequence) and thus allow for efficient prefetching of data.

According to an embodiment of the present invention, the pre-allocated memory area is an area within the main memory. The pre-allocated memory area is larger than the write buffer and the read buffer of the prefetching unit, respectively. According to embodiments, the storing of the filtered first addresses from the write buffer to the pre-allocated memory area is executed upon the write buffer having received as many first addresses as fit into a cache line of the second memory or upon the storage capacity of the write buffer having been reached.

According to an embodiment, the main memory includes a first and a second pre-allocated memory area (PAMA) and the prefetching unit is operable to use the first PAMA in recording mode for recording filtered first addresses in a first recording list contained in the first PAMA while at the same time using a second recording list stored in the second PAMA in playback mode for playing back data of filtered, first addresses of the second recording list. The prefetching unit can be operable to coordinate the work of a list writing module operable to write the recording list from the writing buffer to one of the PAMAs and the work of a list reading module operable to read a playback-list from one of the PAMAs in a way that the first and second PAMA is used by the reading or writing module as needed to allow for a parallel execution of the recording mode in respect to the first recording list and of the playback mode in respect to the second recording list.

According to an embodiment, the processor is operable to execute multiple threads in parallel, wherein each thread has assigned a first PAMA and a second PAMA (thus, for a number of c threads there can exist 2*c PAMAs), thus allowing executing list-recording of a first recording-list in recording mode and playing back a second recording-list in playback mode in parallel for each thread.

According to an embodiment, a first sub-list of the first recording-list of the first PAMA is cached by a second memory. The second memory, e.g. the L2 cache, stores the first sub-list in a first cache area (CA). A second sub-list of the second recording-list of the second PAMA is cached by storing the second sub-list in a second cache area of the second memory. The sub-lists can be as long as and constantly synchronized with the recording lists and playback-list stored in a write buffer (recording list) or read buffer (playback-list) of the prefetching unit. This can be advantageous as the access latencies to the first and/or seconds sub-lists are reduced thereby increasing the processing speed. According to embodiments, a list reader and a list writer having access to a respective one of the cache areas dynamically reserve memory space of the second memory for caching the sub-lists. The list reader can request, e.g. upon a shifting of the addresses in the playback-list, the list addresses following the matching address from the cache area of the second memory. In case the addresses cannot be retrieved from the cache area, the list addresses are retrieved from the PAMA of the main memory.

According to an embodiment, the playback-list is a sub-list of the recording list and has a predefined length. The fraction of the recording-list being currently contained in the playback-list dynamically changes in dependence on the identified matches and resulting address shifts within the playback list.

According to an embodiment, the prefetching unit directly receives the first addresses from ports of the processor. The processor has not yet tried to fetch the data corresponding to the first addresses from the first memory and the information, whether any of the first addresses (load addresses) is actually a hit address or a miss address has not been determined yet.

According to other embodiments, the prefetching unit receives the first addresses from the processor after the processor has already tried to read the data corresponding to the received first addresses from the first memory. Thus, the information if any of the load addresses is actually a miss address or a hit address does already exist. In an embodiment of the present invention, the information can be used to flag each of the received first addresses as miss address or hit address. Thus, according to the embodiments, the one or more first addresses are received from the processor irrespective of the addresses actually being a hit address or a miss address.

According to an embodiment, the flagging of the received first addresses as hit addresses and/or miss addresses is evaluated by the filtering unit for filtering out one or more of the first addresses. For example, a configuration of the filtering unit can have stored one or more patterns of hit- and/or miss addresses. Upon identification of the pattern in the recording list by the filtering unit, the filtering unit filters out (or selectively maintains) the addresses of the recording list which match the pattern.

According to an embodiment, the first memory is an L1 data cache of the processor and the second memory is an L2 data cache of the processor. An 'L1 cache' or 'level I cache' as used herein is a memory bank built into the processing chip. An 'L2 cache' or 'level II cache' as used herein is a secondary memory that feeds the L1 cache. L2 can be built into the processor chip, reside on a separate chip in a multichip package module or be a separate bank of chips on a motherboard. The L1 and L2 cache are static RAM (SRAM), while the main memory is a variety of dynamic RAM (DRAM).

According to an embodiment, the grabbing and receiving of all load addresses from the processor used for accessing the first memory is executed by hardware components, in particular some receiving modules interoperate operable to monitor the requested first addresses at the processor ports. The generation of the recording-list as well as the filtering and storing of the list is executed by some software-based and/or firmware-based components of the prefetching unit.

According to an embodiment, the prefetching unit is one of a plurality of prefetching units. The processor is one of a plurality of processors sharing the second memory. Each processor has assigned a respective one of the prefetching units. The first memory belongs to a plurality of first memories. Each first memory is assigned to a respective one of the processors. Each processor is operable to execute one or more threads, whereby the threads of each processor share the first memory assigned to that processor.

According to an embodiment, a processor as used herein can also be a processor core of a multicore processor.

According to an embodiment, the processor is operable to execute a number (n) of threads in parallel. The prefetching unit of that processor includes the number (n) of filtering units and is operable to manage one recording-list and one playback-list for each of the number of threads. The prefetching unit includes at least one prefetch-engine being used for fetching the data from the second memory and for transferring the data to the first memory for each of the number (n) of threads. Thus, according to an embodiment, the same prefetch-engine can be used for prefetching the data of multiple threads.

According to an embodiment the received one or more first addresses and the one or more second address are virtual addresses pointing to cache lines in the second memory. A matching unit of the prefetching unit uses the virtual addresses for executing the address comparison. The first addresses in the recording-list in the pre-allocated memory area are virtual addresses. The prefetching engine fetches the data indicated by the addresses of the playback-list from the second memory by using the addresses.

According to an embodiment, a translation unit of the prefetching unit or a translation unit external to the prefetching unit translates any of the first addresses in the playback-list into a physical address before the addresses in the playback-list are forwarded to the prefetching engine. The translation is executed immediately before the address in the playback-list is transferred to the prefetching engine. The physical addresses are determined from the virtual addresses right before the moment of using the addresses in order to execute the data fetched.

Using virtual memory addresses is a method for decoupling the memory organization from physical hardware. The applications access memory via virtual addresses. Each time an attempt to access stored data via a virtual address is made, it is necessary to translate the virtual address to physical address. Features of the embodiment can be advantageous because several operating systems which dynamically re-map physical and virtual addresses can re-map the addresses at the moment of prefetching. This can result in the fetching of the wrong data and thus in a decrease in processing speed. By allowing the components of the prefetching unit—except the translation unit and the prefetching engine—to solely work on virtual addresses, the problem can be avoided, as the address translation is executed at a later moment in time where an OS-based remapping does no harm.

According to an embodiment, the prefetching unit enters recording mode upon starting the prefetching unit or upon executing a program loop a first time, thereby generating the recording-list. The prefetching unit enters playback-mode in respect to the recording-list upon executing the program loop a further time.

In a further aspect, the invention relates to a computer-readable medium including computer-readable program code embodied therewith which, when executed by a prefetching unit, cause the prefetching unit to execute a method according to the computer implemented system. Depending on the embodiment, the program code can be software-based, hardware-based, firmware-based or any combination thereof. Some parts of the code can be executed by other hardware components, e.g. the processor, as indicated in the description of the respective method.

In a further aspect, the invention relates to a prefetching unit of a processor. The prefetching unit is operatively connected to a first and a second memory. The first and the second memories are caches within a multi-level cache of the processor. The first memory is at a level of the hierarchy which is closer to the processor than the level of the second memory. The prefetching unit is operable to work in recording mode and/or in playback mode.

In recording mode, the prefetching unit is adapted for: receiving one or more first addresses from the processor, the one or more first addresses being load addresses; filtering the received one or more first addresses for removing at least some of the first addresses from the list; and providing a recording-list including the filtered one or more first addresses.

In playback mode, the prefetching unit is adapted for: receiving one or more second address from the processor; the one or more second address is a load address; receiving a playback-list, the playback-list including all or a subset of the first addresses of the recording-list; comparing the one or more second address with each of the first addresses in the playback-list for identifying a matching address within the playback-list; in case a matching address is identified, fetching data from a second memory, wherein the fetched data is identified by addresses sequential to the position of the matching address in the playback-list; for example, the addresses sequential to the matching position can already be contained in the playback-list at the moment of match determination and/or can be added to the playback-list after a shift of the playback-list; and transferring the fetched data to a first memory; the first and second memories are caches within a multi-level cache of the processor. The first memory is at a level of the hierarchy which is closer to the processor than the level of the second memory.

As will be appreciated by one skilled in the art, aspects of the present invention can be embodied as a system, method, or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon. Any combination of one or more computer readable medium(s) can be utilized. The computer readable medium can be a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device. Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++, a functional programming language such as Haskell, F#.NET or the like and conventional procedural programming languages, such as the "C" programming language or similar programming languages.

Aspects of the present invention are described below with reference to embodiments of the invention depicted in the figures. It will be understood that the block of the diagrams can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the blocks. These computer program instructions can also be stored in a computer-readable medium that can direct a computer, other programmable data processing apparatus, or other devices to function in a particular manner, such that the instructions stored in the computer readable medium produce a non-tangible article of manufacture including instructions which implement the function/act specified in said blocks of the diagrams.

FIG. 1 depicts a flowchart of a method for prefetching data. Where appropriate, references to FIGS. 3 and 4 will be used in the description of FIG. 1.

Data prefetching is a method for increasing the performance of a processor by loading data predicted to be required by the processor in future processing cycles into a processor cache. A processor requiring some data located in a memory block identified by a currently processed address at first tries to load said data from the L1 cache acting as "first memory". In case the L1 cache does not include the required data, the required data is retrieved from the L2 cache. The unsuccessful attempt to load the data from the first cache and the following attempt to fetch it from the second cache will take additional time, thereby slowing down the processor. By predicting the data and corresponding addresses that will be required by the processor in future processing operations and by transferring the data from e.g. the L2 cache to the L1 cache in advance, the effective speed of the processor is increased.

Figure 4:
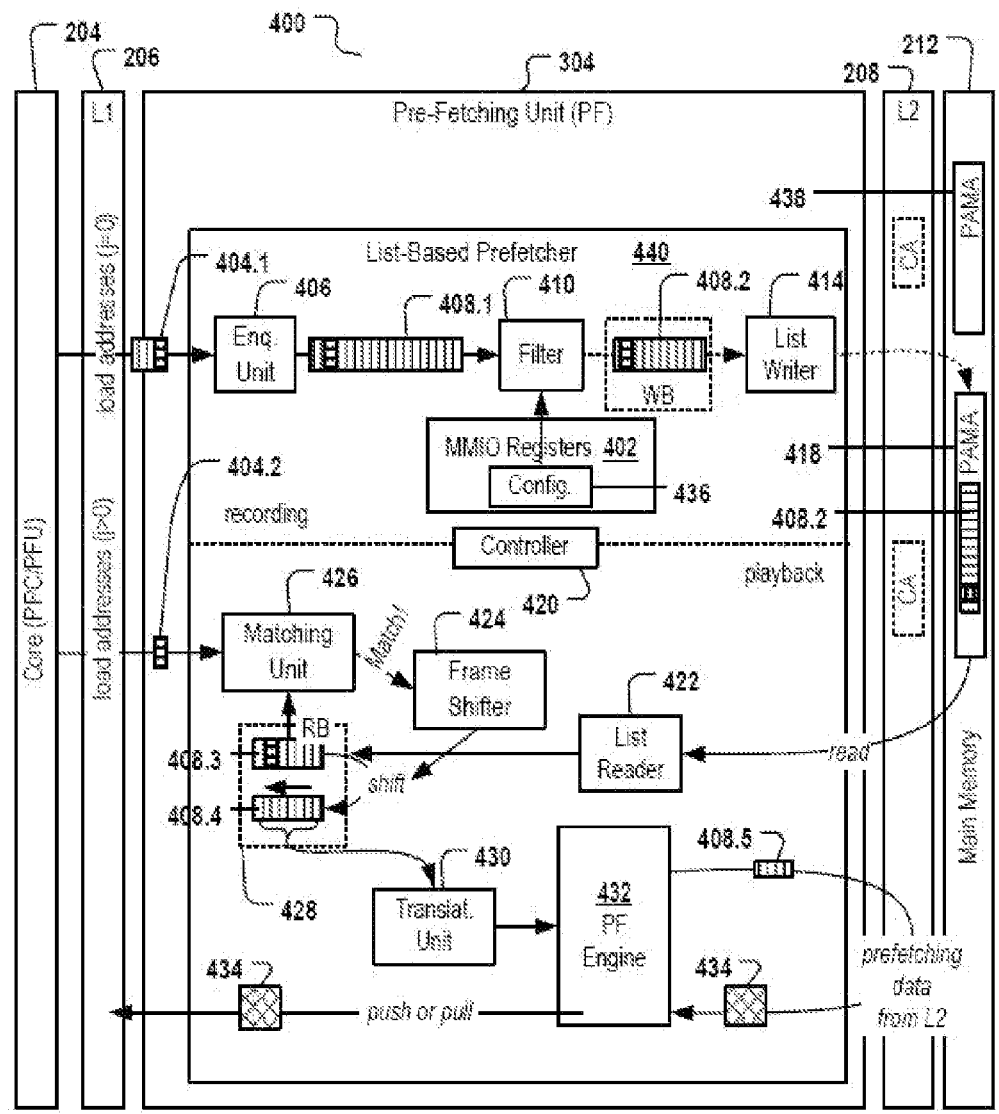
FIG. 4 depicts a prefetching-unit in greater detail.

The method for prefetching data as depicted in the flow chart of FIGS. 1 and 4 includes a first step 102 of receiving one or more first addresses 408.1 by an enqueuing unit 406. The received addresses are load addresses of a processor 204 and are received in chronological sequence as requested by the processor executing some program logic. The first addresses are received irrespective of being a miss address or a hit address. Information on a load address being a hit address or a miss address can not exist at all at the moment of receiving the first addresses or can at least not have any impact on the question if and when the load addresses are received by the enqueuing unit. In step 104, the received first addresses are filtered by a filtering unit 410 using a filter configuration 436 which can be stored in an MMIO registry 402 of the prefetching unit 304. Thereby, the number of first addresses is significantly reduced and a filtered recording list 408.2 is generated which is stored in a write buffer WB. In step 106, the recording list 408.2 is stored by a list writer 414 in a previously allocated memory area (PAMA) 418 of the main memory 212. The steps are executed in recording mode of the prefetching unit. The prefetching unit can operate in recording mode e.g. upon the processor 204 executing a first loop (j=0) of a program routine. A pattern stored in the configuration of the prefetching unit can indicate that all even addresses following a particular address at the beginning of the loop can be required by the processor while the odd addresses will not be evaluated by the processor and can therefore be filtered out from the list 408.2.

In playback mode of the prefetching unit, e.g. upon executing the loop a further time (j>=1), the prefetching unit in step 108 receives at least a second address from the processor. The second address is a load address. The at least one second address can be a hit address or a miss address or a load address whose status in this respect is not known. In step 110, a list reader 422 of the prefetching unit 304 reads a playback list including all or a subset of the filtered first addresses of the recording list stored in the PAMA into a read buffer RB. In case the playback-list was already loaded into the read-buffer RB, the step can merely include accessing the playback-list in the read buffer. A matching unit 426 in step 112 compares the at least one second address with each of the first addresses contained in the playback list 408.3 starting from the first (e.g. leftmost) position of the playback-list and continuing through said list (e.g. from left to right) until a matching address is found or until the end of the list is reached. A match can be found e.g. when executing the program loop having been recorded previously a further time. In case of a match, a frame-shifter 424 shifts all first addresses of the playback-list following the matching address forward (leftward) in the playback-list. Thereby, all first addresses having been enqueued earlier than the matching address as well as the matching address itself are overwritten by the shifted first addresses. The empty address spaces (at the right side) of the playback-list are filled with consecutive first addresses from the recording list 408.2 stored in the PAMA, thereby generating a shifted playback-list 408.4. After having shifted the first addresses as described and after having filled the empty address positions in the playback-list, all addresses in the playback-list are transferred to a prefetching engine 432. The prefetching engine fetches data identified by the first addresses in step 114 from the L2 cache and stores the data into a prefetch engine-internal memory. The prefetch engine can actively transfer the data in step 116 to the processor. Alternatively, step 116 can include the processor actively fetching the data from the prefetch engine-internal memory.

Figure 2:
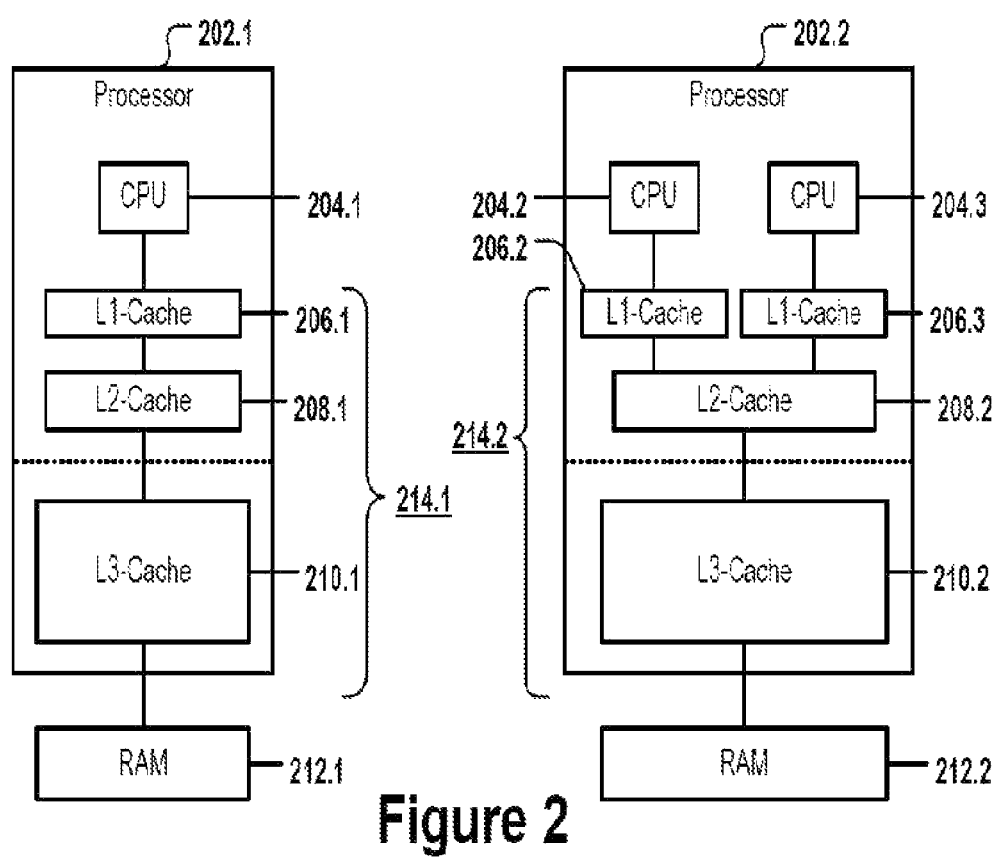
FIG. 2 shows a single-core and a dual-core processor with a multi-level cache hierarchy.

FIG. 2 depicts a single core processor 202.1 and a dual core processor 202.2. Each of the processing cores 204.1, 204.2, 204.3 has assigned exactly one L1 cache 206.1-206.3. The L1 cache is part of a hierarchical cache system 214.1, 214.2 including an L1, L2 and L3 cache. The processing cores 204.2, 204.3 of the dual core processor 202.2 share the L2 cache and the L3 cache. The main memory 212.1, 212.2 as depicted in an embodiment of the present invention is not part of the cache hierarchy.

Figure 3:
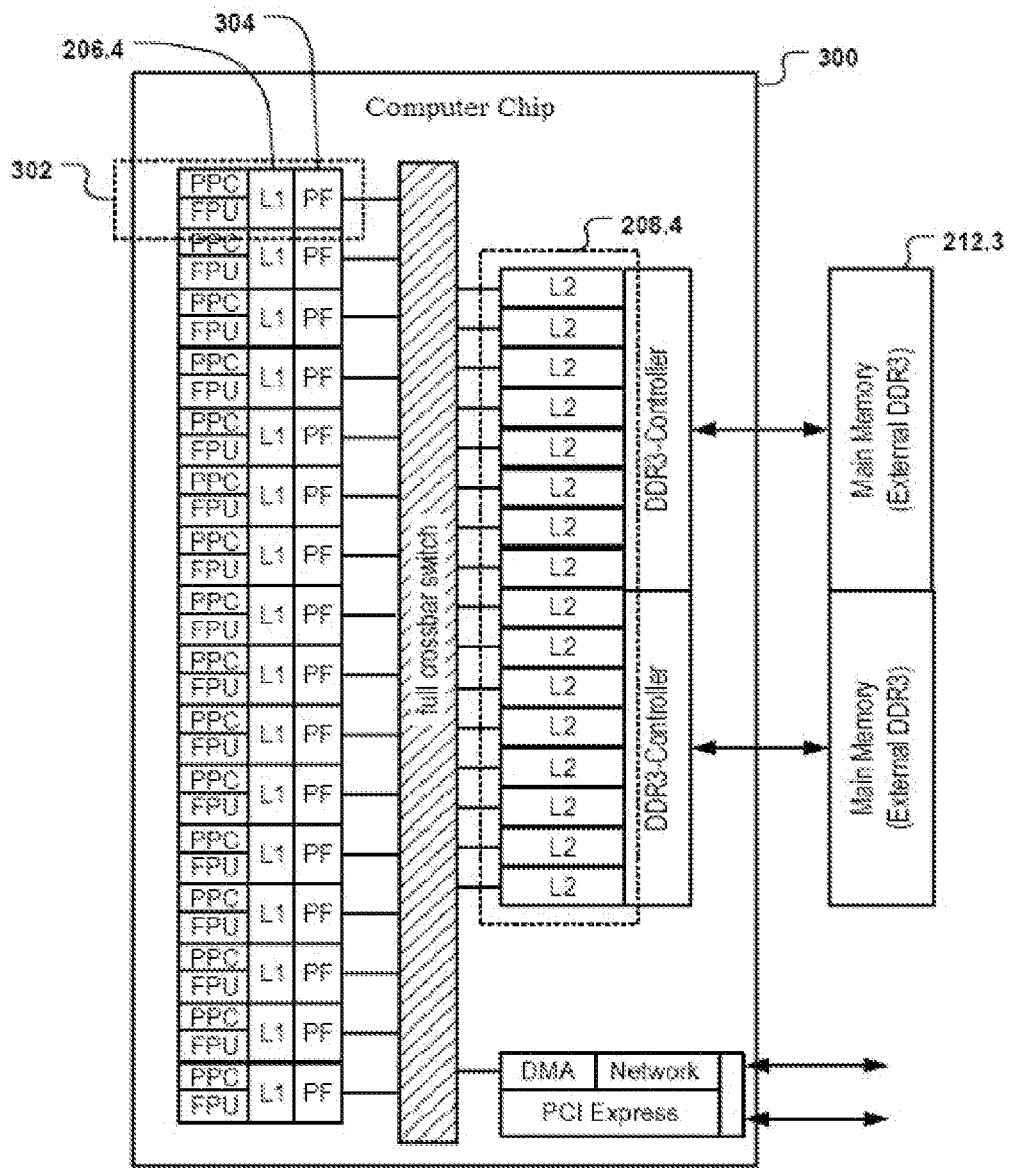
FIG. 3 shows a multi-processor chip including one prefetching unit per processor in greater detail.

FIG. 3 depicts computer chip 300 of a BlueGene/Q Compute Chip including a plurality of processing units 302. Each processing unit includes a power performance chip PPC, a floating-point unit FPU, an L1 cache 206.4 and a prefetching unit (PF) 304. The prefetching unit is operatively coupled to its respective L1 cache, its respective processor PPC and to an L2 cache shared by multiple processing units. The L2 cache 208.4 is coupled via a DDR3-controller to the main memory 212.3. Components of the processing unit 302, the L2 cache 208.4 and the main memory 212.3 largely corresponding in functional terms to elements of FIG. 4 are referred in FIG. 4 by identical numbers.

FIG. 4 depicts a prefetching unit 304 which is used for prefetching data currently stored in the L2 cache 208 to the L1 cache 206 of a processor 204. The processor can be a processing core of a multicore processor. The prefetching unit 304 includes or constitutes a list based prefetching unit 440. A controller 420 controls the operation and interaction of the components of the prefetching unit such as the filter unit 410, the enqueuing unit 406, the list writer 414, the matching unit 426, the frame shifter 424, the list reader 422, the prefetching engine 432, and, if present, also the translation unit 430. The controller can also be operable to switch between recording mode and playback mode in dependence on the program logic executed by the processor and/or can coordinate the list writer and list reader to access the correct one of the two PAMAs 418, 438 in case the prefetching unit executes both modes in parallel. The enqueuing unit 406 is responsible for receiving all load addresses as requested by the processor 204, enqueuing the received addresses and generating a recording list 408.1. The filtering unit 410 is responsible for reducing the size of the recording list 408.1 by applying some filtering procedures based on address patterns and intervals as specified in the filtering configuration 436. The filtering unit outputs a filtered list of first addresses 408.2 and stores said list into a write buffer WB. The list writer 414 is responsible for storing the filtered list 408.2 in the PAMA. The writing is executed at the latest when the write buffer is full. As the PAMA can be much larger than the write buffer, the list writer can append, by each write operation, the content of the write buffer or parts thereof to an already stored recording list 408.2 in the PAMA, thereby creating a recording list 408.2 in the PAMA that is much longer than the maximum content of the write buffer or read buffer. According to some implementation variants, sub-lists of the recording lists stored in the first and second PAMAs 418, 438 can be cached in the second memory in respective cache areas CAs and the list reader and list writer can work on said CAs instead of the PAMAs. For the sake of simplicity, said implementation variants are not described in detail here as at the end, the recording-lists being the basis for said caching are stored in the main memory also in the implementation variants.

The list reader 422 is responsible to read from the PAMA 418, during playback mode of the prefetch unit, a sub-list including a sub-set of first addresses from the recording list 408.2. This sub-list is called "playback-list". The read playback-list 408.3 is stored in a read buffer 428 accessible by a matching unit 426. The task of the matching unit is to receive a currently requested second address 404.2 from the processor and to compare the second address against each first address in the playback list for identifying an identical address referred herein as 'matching address'. The comparison is executed "from left to right", i.e., starting with the first address in the playback-list 408.3 having been enqueued to the list 408.1 during recording mode. The second address is a load address which can be a miss address or a hit address or an address of unknown status. In case a matching address is identified in the list, the frame shifter 424 shifts the first addresses in the playback list following the matching address to the first position in the playback-list (e.g. first position at the left side of the list in FIG. 4) and fills the empty places with first addresses from the recording list in the PAMA as described before. As a result, a shifted, filled-up playback-list 408.4 is generated. For illustration purposes, FIG. 4 depicts two different states of the same playback-list: the playback-list before the match-induced shifting is depicted as 408.3, the playback-list after the shift is depicted as 408.4 Upon each match-induced shift, the addresses in the shifted and refilled playback-list 408.4 are transferred directly to the prefetching engine 432 or can be transferred to a translation unit 430 for transforming the addresses from virtual to physical addresses 408.5 and for forwarding the physical addresses to the prefetching engine. The prefetching engine fetches the data 434 identified by the addresses in the playback list 408.5 into a prefetching engine-internal storage from where the data is transferred to the processor via a push or pull method.

Figure 5:
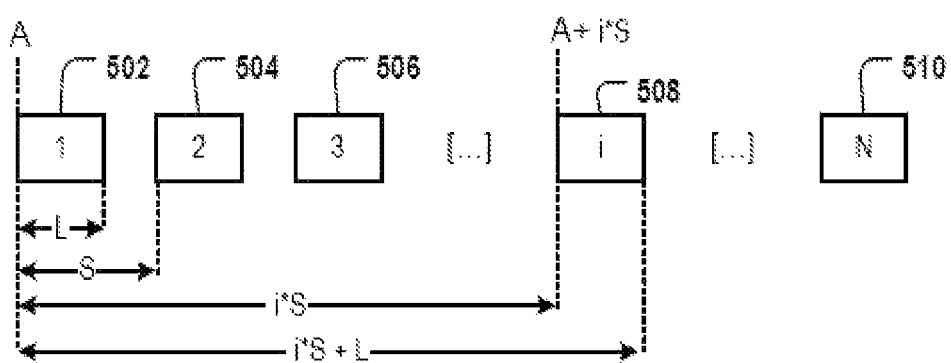
FIG. 5 depicts fragments of a datum to be prefetched.

FIG. 5 depicts a datum to be prefetched. The datum is describable by means of an address pattern. The address pattern can specify a set of addresses where data fragments to be prefetched are stored. In other words, the data fragments 502-510 can constitute a datum D to be prefetched. Each fragment of the datum can be a single address or an address interval including a fixed number of consecutive addresses.

The address pattern can be specified, for example, by a 'start address' A of the datum D, and a number N being indicative of the number of data fragments consecutively following the start address A, the fragment having a fixed size L. The start address is the first address of a main memory area including the N fragments and including the datum D. The start address can be a virtual address specified in the address space 'known' to a currently executed piece of program logic.

The address pattern can also be specified, as shown in FIG. 5, in a more complex manner by means of a 'start address' A of a datum D, a number N being indicative of the number of data fragments following the start address A and respectively including a data fragment of size L, and a stride S. The start address is 'known' to the program logic. The stride indicates the distance between the first address of any two of the fragments 502-510. Each fragment can include one or more addresses. Thus, if the stride S is equal to L, the fragments are directly consecutive. If S is larger than L, the fragments 502-510 are not consecutive but rather are separated by one or more other data fragments not being part of the datum D that shall be prefetched. Thus, in mathematical terms, an address pattern P is a set of addresses that is given by the union of all address intervals [A+i*S, . . . , A+i*S+L [for all i within [0, . . . , N[: P=U{[A+i*S, . . . , A+i*S+L[|i [0, . . . , N[}.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for prefetching data for a processor into a first memory, wherein in a recording mode, a prefetching unit of the processor performs the steps of a method comprising:
   receiving one or more first addresses from the processor, wherein the one or more first addresses is a load address;
   filtering the one or more first addresses for removing at least some of the first addresses from a list;
   providing a recording-list including the filtered one or more first addresses, wherein in a playback mode, the prefetching unit executes:
      receiving at least one second address from the processor, wherein the at least one second address is a load address;
      receiving a playback-list, wherein the playback-list includes all or a subset of the first addresses in the recording-list;
      comparing the at least one second address with each of the first addresses in the playback-list for identifying a matching address within the playback-list;
      fetching data, in case a matching address is identified, from a second memory, wherein the fetched data is identified by addresses sequential to the position of the matching address in the playback-list; and
      transferring the fetched data to the first memory, wherein the first and the second memory are caches within a multi-level cache of the processor,
   wherein the prefetchinq unit enters the recording mode upon starting the prefetchinq unit or upon executing a program loop a first time, thereby generating the recording-list and wherein the prefetching unit enters playback-mode in respect to the recording-list executing the program loop.

2. The computer implemented method of claim 1, wherein filtering comprises:
removing the first addresses which lie within an address interval and/or lie outside an address interval; and
removing the first addresses which follow an address pattern and/or are duplicates of another one of the first addresses in the list, wherein a duplicate first address lies within a predefined number of most recently added first addresses within the list.

3. The computer implemented method of claim 2, wherein the step of filtering is executed by a filtering unit of the prefetching unit, the filtering unit comprising:
configuring a filter comprising a configuration storage, thereby setting the address interval, the address pattern, and/or the predefined number in the configuration storage, wherein the configuring is implemented as a configuration technique selected from a group consisting of: a first technique or a second technique, wherein:
the first technique includes compilation of an executable source code, evaluating, by a compiler, user-specified filtering-annotations within the source code, injecting, by the compiler, filter configuration commands into the compiled code in accordance with the filtering annotations, and storing, by the processor executing the compiled code, the configuration of the filtering unit in accordance with the configuration commands in the configuration storage; and
the second technique includes compilation of an executable source code, evaluating, by a compiler, the source code, wherein the source code is free of user-specified filtering-annotations, injecting, by the compiler, filter configuration commands into the compiled code in accordance with the evaluation results, and storing, by the processor executing the compiled code, the configuration of the filtering unit in accordance with the configuration commands in the configuration storage.

4. The computer implemented method of claim 3, wherein the configuration storage of the filtering includes MMIO registers being readable and writable by the processor.

5. The computer implemented method of claim 1, wherein the recording mode comprises:
storing the recording-list to a write buffer;
writing the recording-list to a pre-allocated memory area;
emptying the write buffer and the recording-list, wherein playback mode further comprises, upon each identification of a current matching address in the playback-list:
determining a first address position within the playback-list, the first address position being the position of the current matching address;
selecting all first addresses in the playback-list directly succeeding the first address position, the selected first addresses having been received and added to the recording-list later than the matching address;
moving the selected first addresses to a corresponding number of address positions in the playback-list at the begin of the playback-list, thereby overwriting all addresses stored in the corresponding number of address positions and creating one or more empty address positions at the end of the play-back list; and
filling all empty address positions by reading a corresponding number of first addresses from the recording list, the read first addresses directly succeeding the last one of the moved selected first addresses;
wherein the first addresses in the recording-list and in the playback-list are ordered chronologically in accordance with the time of being received from the processor.

6. The computer implemented method of claim 1, wherein receiving the first addresses from the processor comprises:
receiving, by the prefetching unit, the first addresses from ports of the processor, or receiving, by the prefetching unit, the first addresses from the processor after the first addresses have been used by the processor for reading data from the first memory.

7. The computer implemented method of claim 6, wherein the first addresses are received from the processor after the first addresses have been used by the processor for reading data from the first memory and wherein the received first addresses are flagged as a hit address or a miss address and the flagging is evaluated by the filtering unit for filtering out one or more of the first addresses.

8. The computer implemented method of claim 1, wherein the first memory is an L1 data cache of the processor and wherein the second memory is an L2 data cache of the processor.

9. The computer implemented method of claim 1, wherein:
the prefetching unit is one of a plurality of prefetching units;
the processor is one of a plurality of processors, the plurality of processors share the second memory, and each processor is assigned a respective one of the prefetching units; and
the first memory is one of a plurality of first memories, each of the first memories is assigned to a respective one of the processors, each processor being operable to execute one or more threads, and the threads of each processor share the first memory assigned to the processor.

10. The computer implemented method of claim 1, wherein:
the processor is operable to execute a number (n) of threads in parallel;
the prefetching unit of the processor comprises the number (n) of filtering units;
the prefetching unit of the processor is operable to manage one recording-list and one playback-list for each of the number (n) of threads; and
the prefetching unit comprises one prefetch-engine for fetching the data from the second memory and for transferring the data to the first memory for each of the number (n) of threads.

11. The computer implemented method of claim 1, wherein:
the received one or more first addresses and the at least one second addresses are virtual addresses pointing to cache lines in the second memory;
a matching unit of the prefetching unit uses the virtual addresses for executing the address comparison; and
the first addresses in the recording-list in the pre-allocated memory area are virtual addresses.

12. The method of claim 11, further comprising:
translating, by a translation unit of the prefetching unit or by a translation unit external to the prefetching unit, each of the first addresses in the playback-list into a physical address; and
executing the fetching of the data from the second memory by using the physical address.

13. The computer implemented method of claim 1, wherein:
the allocated memory area is one of at least a first and a second allocated memory area respectively being used for storing a recording-list;

the prefetching unit is in recording-mode in respect to a first recording list using the first allocated memory area for storing the first recording-list; and the prefetching unit, simultaneously, is in playback-mode in respect to a second recording list using the second allocated memory for storing the second recording list and for playing-back the second recording list.

14. A computer implemented method for prefetching data for a processor into a first memory, wherein in a recording mode, a prefetching unit of the processor performs the steps of a method comprising:

receiving one or more first addresses from the processor, wherein the one or more first addresses is a load address;

filtering the one or more first addresses for removing at least some of the first addresses from a list;

providing a recording-list including the filtered one or more first addresses, wherein in a playback mode, the prefetching unit executes:

receiving at least one second address from the processor, wherein the at least one second address is a load address;

receiving a playback-list, wherein the playback-list includes all or a subset of the first addresses in the recording-list;

comparing the at least one second address with each of the first addresses in the playback-list for identifying a matching address within the playback-list;

fetching data, in case a matching address is identified, from a second memory, wherein the fetched data is identified by addresses sequential to the position of the matching address in the playback-list; and transferring the fetched data to the first memory, wherein the first and the second memory are caches within a multi-level cache of the processor, wherein:

the processor executes a number (n) of threads in parallel, the prefetching unit of the processor comprises the number (n) of filtering units, the prefetching unit of the processor manages one recording-list and one playback-list for each of the number (n) of threads, and the prefetching unit comprises one prefetch-engine for fetching the data from the second memory and for transferring the data to the first memory for each of the number (n) of threads.

15. A computer implemented method for prefetching data for a processor into a first memory, wherein in a recording mode, a prefetching unit of the processor performs the steps of a method comprising:

receiving one or more first addresses from the processor, wherein the one or more first addresses is a load address;

filtering the one or more first addresses for removing at least some of the first addresses from a list;

providing a recording-list including the filtered one or more first addresses, wherein in a playback mode, the prefetching unit executes:

receiving at least one second address from the processor, wherein the at least one second address is a load address;

receiving a playback-list, wherein the playback-list includes all or a subset of the first addresses in the recording-list;

comparing the at least one second address with each of the first addresses in the playback-list for identifying a matching address within the playback-list;

fetching data, in case a matching address is identified, from a second memory, wherein the fetched data is identified by addresses sequential to the position of the matching address in the playback-list; and transferring the fetched data to the first memory, wherein the first and the second memory are caches within a multi-level cache of the processor, wherein:

the allocated memory area is one of at least a first and a second allocated memory area respectively being used for storing a recording-list, the prefetching unit is in recording-mode in respect to a first recording list using the first allocated memory area for storing the first recording-list, and the prefetching unit, simultaneously, is in playback-mode in respect to a second recording list using the second allocated memory for storing the second recording list and for playing-back the second recording list.

* * * * *